US012560146B2

(12) United States Patent
Haag et al.

(10) Patent No.: US 12,560,146 B2
(45) Date of Patent: Feb. 24, 2026

(54) LEADING EDGE PROTECTION FOR A WIND TURBINE BLADE

(71) Applicant: LM WIND POWER A/S, Kolding (DK)

(72) Inventors: Michael Drachmann Haag, Kolding (DK); Torben Krogsdal Jacobsen, Kolding (DK); Laurids Andersen, Kolding (DK)

(73) Assignee: LM WIND POWER A/S, Kolding (DK)

( * ) Notice: Subject to any disclaimer, the term of this patent is extended or adjusted under 35 U.S.C. 154(b) by 0 days.

(21) Appl. No.: 18/628,873

(22) Filed: Apr. 8, 2024

(65) Prior Publication Data

US 2024/0254961 A1 Aug. 1, 2024

Related U.S. Application Data

(63) Continuation of application No. 17/798,467, filed on Aug. 9, 2022, now Pat. No. 11,976,626.

(51) Int. Cl.
  *F03D 1/06* (2006.01)
  *F03D 80/30* (2016.01)
(52) U.S. Cl.
  CPC .......... *F03D 1/0675* (2013.01); *F03D 1/0608* (2013.01); *F03D 1/0633* (2013.01); *F03D 1/06495* (2023.08); *F03D 1/065* (2013.01); *F03D 80/30* (2016.05); *F05B 2230/90* (2013.01); *F05B 2240/30* (2013.01); *F05B 2240/301* (2013.01); *F05B 2240/303* (2020.08); *F05B 2240/307* (2020.08);
  (Continued)

(58) Field of Classification Search
  CPC .............. F05B 2230/90; F05B 2240/30; F05B 2240/301; F05B 2240/303; F05B 2240/307; F05B 2280/10; F05B 2280/103; F05B 2280/104; F05B 2280/4004; F05B 2280/6003; F05B 2280/702; Y02E 10/72
  See application file for complete search history.

(56) References Cited

U.S. PATENT DOCUMENTS

| | | | |
|---|---|---|---|
| 4,895,491 A | 1/1990 | Cross et al. | |
| 2007/0036659 A1* | 2/2007 | Hibbard | B29C 66/303 416/233 |

(Continued)

FOREIGN PATENT DOCUMENTS

| | | |
|---|---|---|
| EP | 3536947 A1 | 9/2019 |
| EP | 3098438 B1 | 12/2019 |

(Continued)

*Primary Examiner* — Binh Q Tran
(74) *Attorney, Agent, or Firm* — Nath, Goldberg & Meyer; Tanya E. Harkins

(57) ABSTRACT

A leading-edge protector element for protecting a leading-edge of a wind turbine blade is provided. The leading-edge protector element includes a film layer and a rubber layer, and is provided on a coiled-up roll. The leading-edge protector element has a thickness between a first edge, a second edge, a third edge, and a fourth edge. The thickness decreases along a transverse direction towards the third edge and towards the fourth edge. The leading-edge protector element for protecting a leading-edge of a wind turbine blade may alternatively only include a rubber layer and also be provided on a coiled-up roll.

16 Claims, 7 Drawing Sheets

(52) U.S. Cl.
    CPC ..... *F05B 2280/10* (2013.01); *F05B 2280/103*
       (2013.01); *F05B 2280/104* (2013.01); *F05B*
       *2280/4004* (2013.01); *F05B 2280/702*
       (2013.01)

(56) References Cited

U.S. PATENT DOCUMENTS

| | | | | |
|---|---|---|---|---|
| 2008/0107540 | A1* | 5/2008 | Bonnet | F03D 1/0675 |
| | | | | 415/119 |
| 2008/0181775 | A1 | 7/2008 | Livingston et al. | |
| 2012/0156049 | A1* | 6/2012 | Hong | F04D 29/322 |
| | | | | 416/241 A |
| 2013/0101426 | A1* | 4/2013 | Saitou | F03D 1/0675 |
| | | | | 416/224 |
| 2015/0132140 | A1* | 5/2015 | Haag | F03D 1/0633 |
| | | | | 416/224 |
| 2016/0009369 | A1 | 1/2016 | Aliaga et al. | |
| 2018/0208302 | A1 | 7/2018 | Schaube et al. | |
| 2018/0304605 | A1* | 10/2018 | Kuhn | B32B 25/08 |
| 2019/0263096 | A1* | 8/2019 | Baertl | B32B 5/028 |
| 2020/0040869 | A1* | 2/2020 | Stege | B32B 37/182 |

FOREIGN PATENT DOCUMENTS

| | | | |
|---|---|---|---|
| WO | 2012113623 | A1 | 8/2012 |
| WO | 2018149970 | A1 | 8/2018 |
| WO | 2019115372 | A1 | 6/2019 |

* cited by examiner

LEADING EDGE PROTECTION FOR A WIND TURBINE BLADE

CROSS-REFERENCE TO RELATED APPLICATIONS

This application is a continuation of U.S. application Ser. No. 17/798,467, filed on Aug. 9, 2022, which is a National Phase Application filed under 35 U.S.C. § 371 as a national stage of PCT Application No. PCT/EP2021/053074, filed on Feb. 9, 2021, which claimed the benefit of Great Britain Application No. 2001775.2, filed on Feb. 10, 2020, the content of each of which is hereby incorporated by reference in its entirety.

BACKGROUND

Field

The present disclosure relates to wind turbine blades and manufacture of wind turbine blades. More specifically, the present disclosure pertains to the field of protection of wind turbine blades, such as protection of the leading edge of wind turbine blades.

Description of Related Art

As wind turbines increase in size, wind turbine blades increase in length which means that tip speed of the wind turbine blades increases. Furthermore, for wind turbines located off-shore noise may be less of a concern meaning that a higher tip speed of the wind turbine blades may be allowed. Thus, large wind turbine blades, especially for off-shore use, often have to withstand a higher velocity and thus need to be more robust. During rotation with higher velocities, the airfoil, especially at the leading edge, is subject to increased wear caused by impact with particles in the air. To reduce the wear on the leading edge there is a need for a robust material on the wind turbine blade, and especially the leading edge.

SUMMARY OF THE INVENTION

It is an object of the present disclosure to provide a leading edge protection element and a leading edge portion of a wind turbine blade which overcomes at least some of the disadvantages of the prior art.

In particular, it is an object of the present invention to provide a method for protecting a leading edge of a wind turbine blade, which improves the robustness of wind turbine blades. Improvement in the robustness of the wind turbine blade may further prolong the life span of the individual wind turbine blades, in addition to a higher energy yield due to a higher rotation velocity during operation of the wind turbine blades.

Thus, the present invention relates to a leading edge protection element for a wind turbine blade. The leading edge protection element extends in a longitudinal direction between a first edge and a second edge. The leading edge protection element extends in a transverse direction between a third edge and a fourth edge. The leading edge protection element has a first surface and a second surface. The leading edge protection element may comprise a film layer having a first film surface and a second film surface. The first film surface may form the first surface of the leading edge protection element. The film layer may comprise a metal material.

The leading edge protection element may comprise a rubber layer of a rubber material, wherein the rubber layer has a first rubber surface and a second rubber surface. The second rubber surface may form the second surface of the leading edge protection element. The second film surface and the first rubber surface may be bonded to each other.

In a preferred embodiment the film layer may be chemically treated to remove any oxide layer of the metal material before the second film surface and the first rubber surface are bonded to each other. The thickness between the first surface and the second surface of the leading edge protection element may decreases along the transverse direction towards the third edge and/or towards the fourth edge.

In a preferred embodiment a kit comprising a plurality of leading edge protection elements is provided. For example, a kit comprising a first leading edge protection element, such as the leading edge protection element disclosed above and further described below, and a second leading edge protection element such as the leading edge protection element disclosed above and further described below. The second leading edge protection element may be different than the first leading edge protection element. The second leading edge protection element and the first leading edge protection element may comprise different features.

It is an advantage of the present disclosure that a better protection of a wind turbine blade is provided due to the robust leading edge protection element. It is a further advantage of the present disclosure that a strong leading edge protection element, e.g. comprising metal, may be provided which is less prone to damages during handling. Particularly, the rubber layer decreases the risk of unintentionally damaging the film layer when handling the leading edge protection element. Furthermore, the rubber layer decouples the outer film layer of metal of the LEP from the wind turbine blade while keeping the film layer and wind turbine blade in indirect contact. The rubber layer, in other words, helps in isolating the mechanical strains arising from the blade body from impacting the outer film layer and vice versa.

Also disclosed is a method for protecting a leading edge of a wind turbine blade extending from a root to a tip. The wind turbine blade comprises a root region, an airfoil region with the tip, a pressure side, a suction side and a chord line extending between the leading edge and a trailing edge. The method comprises providing one or more leading edge protection elements, such as the leading edge protection element as disclosed above, and further described below, such as the first leading edge protection element and/or the second leading edge protection element.

In a preferred embodiment the film layer may be chemically treated to remove any oxide layer of the metal material before the second film surface and the first rubber surface are bonded to each other. The thickness between the first surface and the second surface of the leading edge protection element may decreases along the transverse direction towards the third edge and/or towards the fourth edge.

In a preferred embodiment the method comprises providing a plurality of leading edge protection elements. For example, a first leading edge protection element, such as the leading edge protection element disclosed above and further described below, and a second leading edge protection element, such as the leading edge protection element disclosed above and further described below. The second leading edge protection element may be different than the first leading edge protection element. The second leading edge protection element and the first leading edge protection element may comprise different features.

The leading edge protection element, such as the first leading edge protection element and/or the second leading edge protection element, may be attached to at least a part of the leading edge of the wind turbine blade. The leading edge protection element(s) may be attached by applying an adhesive, e.g. a pressure sensitive adhesive or a two component adhesive and/or a heat activated adhesive, between the leading edge protection element(s) and the leading edge of the wind turbine blade. For example, the adhesive may be applied on the second surface of the leading edge protection element(s) and/or on a portion of the leading edge of the wind turbine blade.

In a preferred embodiment the first leading edge protection element and the second leading edge protection element may be attached to respective parts of the leading edge of the wind turbine blade. For example, the first leading edge protection element may be attached closer to the tip than the second leading edge protection element.

The second leading edge protection element may be attached to the leading edge of the wind turbine bade in extension of the first leading edge protection element.

The first leading edge protection element may be attached to a first part of the leading edge between a first blade position and a second blade position. The second leading edge protection element may be attached to a second part of the leading edge between a third blade position and a fourth blade position. The first blade position may be closer to the tip than the second, third, and fourth blade positions. The fourth blade position may be farther away from the tip than the first, second, and third blade positions. The second and the third blade position may be between first blade position and the fourth blade position. The second and the third blade position may be the same blade position, alternatively, the third blade position may be between the second blade position and the fourth blade position and/or the second blade position may be between the first blade position and the third blade position.

By attaching or consolidating the rubber layer of the leading edge protection element with the surface of leading edge of the blade, impact of irregularities of the blade surface geometry may be reduced. Furthermore, the need for polishing and finishing of the surface of the leading edge before the leading edge protection element is attached may be reduced.

The leading edge protection element(s) may be oriented such that the second surface of the leading edge protection element(s) faces the leading edge of the wind turbine blade. The leading edge protection element(s) may be arranged such that the third edge and/or the fourth edge extend substantially parallel to the longitudinal direction of the wind turbine blade. For example, the third edge may extend along the leading edge on the pressure side, and/or the fourth edge may extend along the leading edge on the suction side.

The second film surface and the first rubber surface may be bonded by vulcanization of the rubber layer. Alternatively, the second film surface and the first rubber surface may be bonded by application of an adhesive, such as a pressure sensitive adhesive, a two component adhesive and/or a heat activated adhesive. The film layer may be chemically treated, e.g. with an acidic or alkaline solution, to remove any oxide layer of the metal material before the second film surface and the first rubber surface are bonded to each other. The chemical treatment may ensure a strong bond between the rubber layer and the film layer.

The film layer may be made of a metal material. The film layer may be a metal film layer. The metal material may comprise nickel-based alloy, titanium, stainless steel, shape memory alloys, austenitic nickel-chromium-based alloys, and/or aluminium. The thickness of the film layer may be less than 0.8 mm, such as less than 0.5 mm, such as between 0.1-0.4 mm.

The rubber material may comprise one or more of nitrile rubber (NBR), ethylene propylene diene monomer (EPDM), polyurethane (PUR), styrene-butadiene rubber (SBR) or polybutadiene. The rubber material may have a Shore A indentation hardness of less than 90. The rubber material may have a Shore D hardness of less than 40. The Shore A and/or D hardness may be measured according to measurements under DIN ISO 7619-1. The measurement may be made at a centre point of the measured material. The thickness of the rubber layer in a first rubber layer position between the first rubber surface and the second rubber surface may be between 0.1-5.0 mm, such as between 0.5-2.0 mm. The first rubber layer position may be the thickest point of the rubber layer. For example, the thickness of the rubber layer in the first rubber layer position may be the maximum thickness of the rubber layer.

The first leading edge protection element and the second leading edge protection element may be made of different materials. For example, the film layer of the first leading edge protection element may be a harder metal than the film layer of the second leading edge protection element.

The first leading edge protection element and the second leading edge protection element may comprise different layers. For example, the first leading edge protection element may comprise a film layer and a rubber layer. The second leading edge element may comprise only a film layer or only a rubber layer. The second leading edge element may comprise a film layer and a rubber layer.

The thickness of the film layer of the first leading edge protection element the thickness of the film layer of the second leading edge protection element may be different. For example, the thickness of the film layer of the first leading edge protection element may be larger than the thickness of film layer of the second leading edge protection element. Alternatively, the thickness of the film layer of the first leading edge protection element may be smaller than the thickness of the rubber layer of the second leading edge protection element.

The thickness of the rubber layer of the first leading edge protection element and the thickness of the rubber layer of the second leading edge protection element may be different. For example, the thickness of the rubber layer of the first leading edge protection element may be larger than the thickness of rubber layer of the second leading edge protection element. Alternatively, the thickness of the film layer of the first leading edge protection element may be smaller than the thickness of the rubber layer of the second leading edge protection element.

The thickness of the film layer of the first leading edge protection element may be larger than the thickness of the film layer of the second leading edge protection element while the thickness of the rubber layer of the first leading edge protection element is smaller than the thickness of the rubber layer of the second leading edge protection element.

The thickness of the film layer of the first leading edge protection element may be smaller than the thickness of the film layer of the second leading edge protection element while the thickness of the rubber layer of the first leading edge protection element is larger than the thickness of the rubber layer of the second leading edge protection element.

The variations disclosed above are merely examples. However, any of parameters of film material, rubber material, thickness of film layer, thickness of rubber layer, length, or width may differ between the first leading edge protection element and the second leading edge protection element.

The width of the leading edge protection element, such as the first leading edge protection element and/or the second leading edge protection element, in the transverse direction may be between 40-500 mm, e.g. between 50-400 mm, e.g. between 50-100 mm or between 200-400 mm. The leading edge protection element(s) may extend in the transverse direction across the leading edge of the wind turbine blade, e.g. the intersection between the suction side and the pressure side of the wind turbine blade.

The length of the leading edge protection element, such as the first leading edge protection element and/or the second leading edge protection element, in the longitudinal direction, e.g. the distance between the first edge and the second edge, may be the same as the length of the leading edge of the wind turbine blade. Alternatively, the length may be smaller than the length of the leading edge of the wind turbine blade. The tip of the wind turbine blade travels with the highest velocity and the leading edge near the tip is therefore subject to most wear. Therefore, it may be sufficient to apply the leading edge protection element(s) to only a part of the leading edge towards the tip of the wind turbine blade. For example, the length of the leading edge protection element(s) may be between 10-100 m, such as between 15-70 m, such as between 20-50 m. For example, the leading edge protection element(s) may extend in the longitudinal direction along at least 10% of the length of the wind turbine blade, such as at least 20% of the length, such as at least 50% of the length. The leading edge protection element(s) may extend in the longitudinal direction along less than 50% of the length of the wind turbine blade, such as less than 30% of the length, such as less than 15% of the length. The leading edge protection element(s) may extend in the longitudinal direction starting from the tip or near the tip.

It is an even further advantage of the present disclosure that the leading edge protection element is light weight yet robust. Furthermore, the specific thickness of the film layer and the rubber layer provides a flexible leading edge protection element, which may be easily handled and stored.

The leading edge protection element according to the present disclosure, such as the first leading edge protection element and/or the second leading edge protection element, may be provided in length longer than the length of a single wind turbine blade and may be cut to desired lengths. The length of the leading edge protection element in the longitudinal direction, e.g. the distance between the first edge and the second edge, may be longer than the length of the leading edge of the wind turbine blade. For example, the length of the leading edge protection element may be more than 100 m, such as more than 200 m, such as more than 300 m.

The leading edge protection element, such as the first leading edge protection element and/or the second leading edge protection element, may be coiled on a roll. The leading edge protection element may be cut to the desired length, e.g. between 10-100 m, such as between 15-70 m, such as between 20-50 m, such as 30 m. Providing the leading edge protection element may comprise providing a roll, such as a roll with a coiled up leading edge protection element.

The thickness of the leading edge protection element, such as the first leading edge protection element and/or the second leading edge protection element, may decrease, e.g. by chamfering towards any or all of the edges, e.g. to provide for a smooth transition to the surface whereon the leading edge protection element is applied. The thickness between the first surface and the second surface of the leading edge protection element may decrease along the transverse direction towards the third edge and/or towards the fourth edge, e.g. the leading edge protection element is tapered towards the third edge and/or towards the fourth edge such that the transition from the leading edge protection element to the airfoil is minimal. The thickness between the first surface and the second surface of the leading edge protection element may decrease along the longitudinal direction towards the first edge and/or towards the second edge, e.g. the leading edge protection element is tapered towards the first edge and/or towards the second edge.

The thickness between the first film surface and the second film surface of the film layer may be substantially uniform. The thickness between the first rubber surface and the second rubber surface of the rubber layer of leading edge protection element may decrease along the transverse direction towards the third edge and/or towards the fourth edge. The thickness between the first rubber surface and the second rubber surface of the rubber layer of leading edge protection element may decrease along the transverse direction towards the first edge and/or second edge. The tapering of the leading edge protection element towards its edges may be provided by decreasing the thickness of the rubber layer while the thickness of the film layer is substantially uniform.

Also disclosed is a method for manufacturing a leading edge portion of a wind turbine blade. The leading edge portion has a primary surface and a secondary surface opposite the primary surface.

The method comprises providing a leading edge protection element, such as the leading edge protection element as described above, such as the first leading edge protection element and/or the second leading edge protection element.

A mould for moulding the leading edge portion of the wind turbine blade may be provided. The mould may comprise a moulding surface configured for forming the primary surface of the leading edge portion.

The leading edge protection element(s) may be laid up covering a first part of the moulding surface of the mould. The leading edge protection element(s) may be oriented such that the first surface of the leading edge protection element(s) faces the moulding surface of the mould.

Shell material, e.g. fibre reinforced material, may be laid up in the mould covering the second surface of the leading edge protection element(s). The shell material may be laid up such that the shell material covers a second part and/or a third part of the moulding surface of the mould. The second part and the third part of the moulding surface of the mould may be separated by the first part of the moulding surface of the mould.

The leading edge protection element(s) and the shell material may be consolidated to form the leading edge portion, e.g. the leading edge protection element(s) and the shell material may be infused with a resin and the resin may be cured. Vacuum assisted resin transfer moulding (VARTM) may be applied. Alternatively, the shell material may be pre-impregnated, e.g. the shell material may comprise a pre-preg fibre glass material. The leading edge protection element(s) and the pre-preg material may be consolidated under pressure to from the leading edge portion. Optionally, heat may be applied during consolidation.

The first surface of the leading edge protection element(s) may form a section of the primary surface of the leading edge portion. The shell material may form the secondary surface of the leading edge portion. The shell material may form a section of the primary surface of the leading edge portion. For example, the first surface of the leading edge protection element(s) may form a first section of the primary surface of the leading edge portion and the shell part may form a second section of the primary surface of the leading edge portion. The leading edge portion may be attached to a leading part of a wind turbine blade part, such as a wind turbine blade part comprising a pressure side and a suction side and a trailing edge. The leading edge portion may be attached to a leading part of the pressure side of the wind turbine blade part and a leading part of the suction side of a wind turbine blade part, e.g. by orienting the leading edge portion such that the secondary surface faces the wind turbine blade part.

The leading edge portion may be attached to the wind turbine blade part, e.g. by applying an adhesive between the wind turbine blade part and the leading edge portion. For example, the adhesive may be applied to a first part of the secondary surface of the leading edge portion and a second part of the secondary surface of the leading edge portion and/or to the leading part of the pressure side of the wind turbine blade part and the leading part of the suction side of the wind turbine blade part. Alternatively, adhesive may be applied to a first part of the primary surface of the leading edge portion and a second part of the primary surface of the leading edge portion and/or the inner surface of the leading part of the pressure side and the inner surface of the leading part of the suction side.

The leading edge portion may be attached to the wind turbine blade part, e.g. such that the first part of the secondary surface is attached to the leading part of the pressure side the wind turbine blade and a second part of the secondary surface of the leading edge portion is attached to the leading part of the suction side of the wind turbine blade part. Alternatively, leading edge portion may be attached to the wind turbine blade part such that the first part of the primary surface is attached to the inner surface of the leading part of the pressure side and the second part of the primary is attached to the inner surface of the leading part of the suction side.

Also disclosed is a wind turbine blade extending from a root to a tip. The wind turbine blade comprises a root region, an airfoil region with the tip, a pressure side, a suction side and a chord line extending between a leading edge and a trailing edge. The wind turbine blade comprises one or more leading edge protection elements, such as the leading edge protection element(s) as described above, such as the first leading edge protection element and/or the second leading edge protection element, forming the leading edge.

In a preferred embodiment the film layer may be chemically treated to remove any oxide layer of the metal material before the second film surface and the first rubber surface are bonded to each other. The thickness between the first surface and the second surface of the leading edge protection element may decreases along the transverse direction towards the third edge and/or towards the fourth edge.

In a preferred embodiment the wind turbine blade comprises at least two leading edge protection elements, such as the leading edge protection element as disclosed above. For example, the wind turbine blade may comprise a first leading edge protection element and a second leading edge protection element. The second leading edge protection element may be different from the first leading edge protection element. The second leading edge protection element and the first leading edge protection element may comprise different features.

The first leading edge protection element may extend from a first blade position, e.g. at the tip or near the tip of the wind turbine blade, to a second blade position of the wind turbine blade. The second leading edge protection element may extend from a third blade position, which may be the second blade position, of the wind turbine blade to a fourth blade position of the wind turbine blade.

The first blade position may be closer to the tip than the second, third, and fourth blade positions. The fourth blade position may be farther away from the tip than the first, second, and third blade positions. The second and the third blade position may be between first blade position and the fourth blade position. The second and the third blade position may be the same blade position. Alternatively, the third blade position may be between the second blade position and the fourth blade position and/or the second blade position may be between the first blade position and the third blade position.

The second leading edge protection element may be arranged in extension of the first leading edge protection element.

The first leading edge protection element and the second leading edge protection element may have different lengths. For example, the first leading edge protection element may have a lager length than the second leading edge protection element, or the second leading edge protection element may have a larger length than the first leading edge protection element.

The first leading edge protection element and the second leading edge protection element may have some features that are the same, e.g., material, dimensions. In some embodiments, the first leading edge protection element and the second leading edge protection element may be the same.

It is envisaged that any embodiments or elements as described in connection with any one aspect may be used with any other aspects or embodiments, mutatis mutandis.

BRIEF DESCRIPTION OF THE FIGURES

Embodiments of the invention will be described in more detail in the following with regard to the accompanying figures. Like reference numerals refer to like elements throughout. Like elements may, thus, not be described in detail with respect to the description of each figure. The figures show one way of implementing the present invention and are not to be construed as being limiting to other possible embodiments falling within the scope of the attached claim set. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

DETAILED DESCRIPTION

In the following figure description, the same reference numbers refer to the same elements and may thus not be described in relation to all figures.

Figure 1:
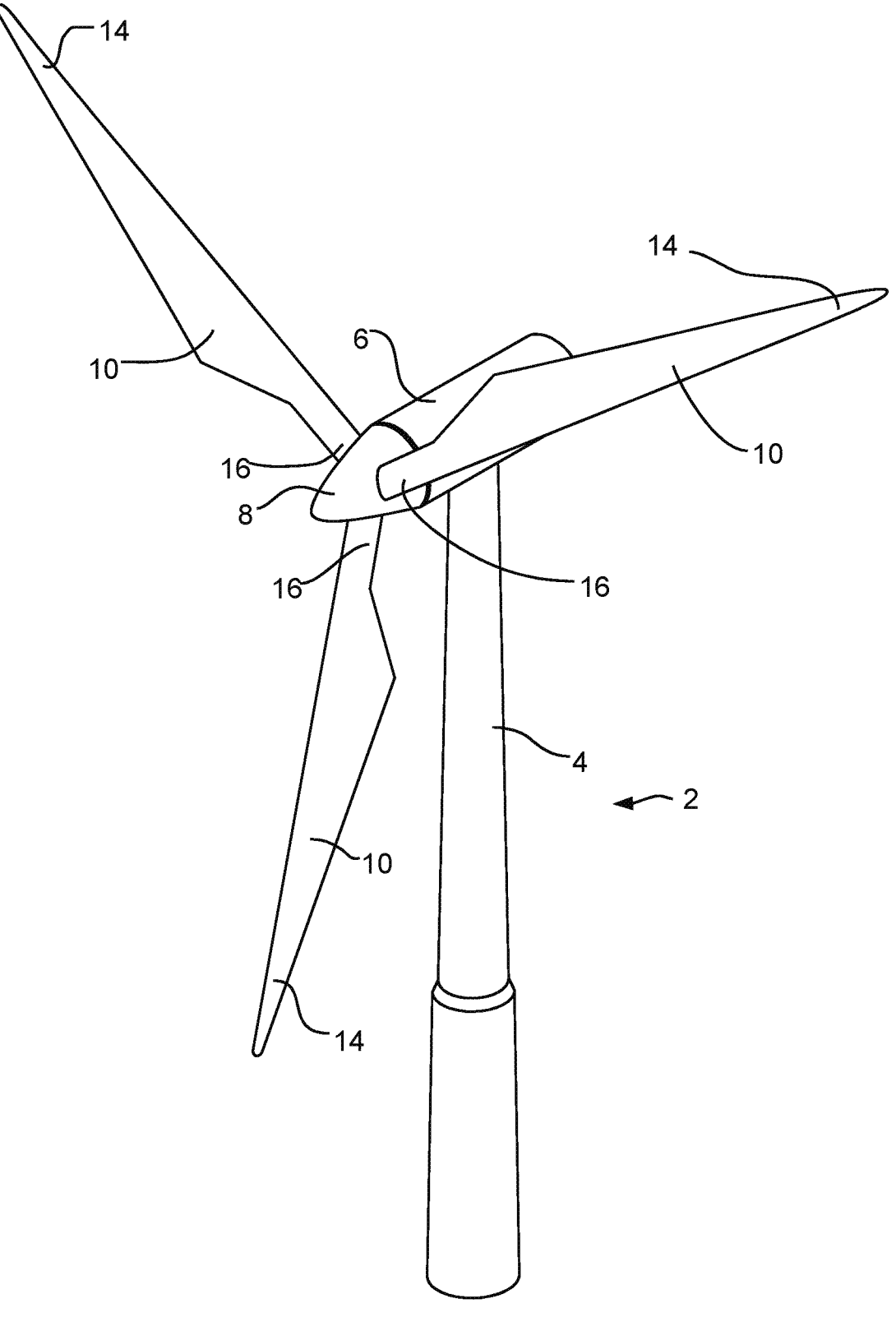
FIG. 1 is a schematic diagram illustrating an exemplary wind turbine.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8.

Figure 2:
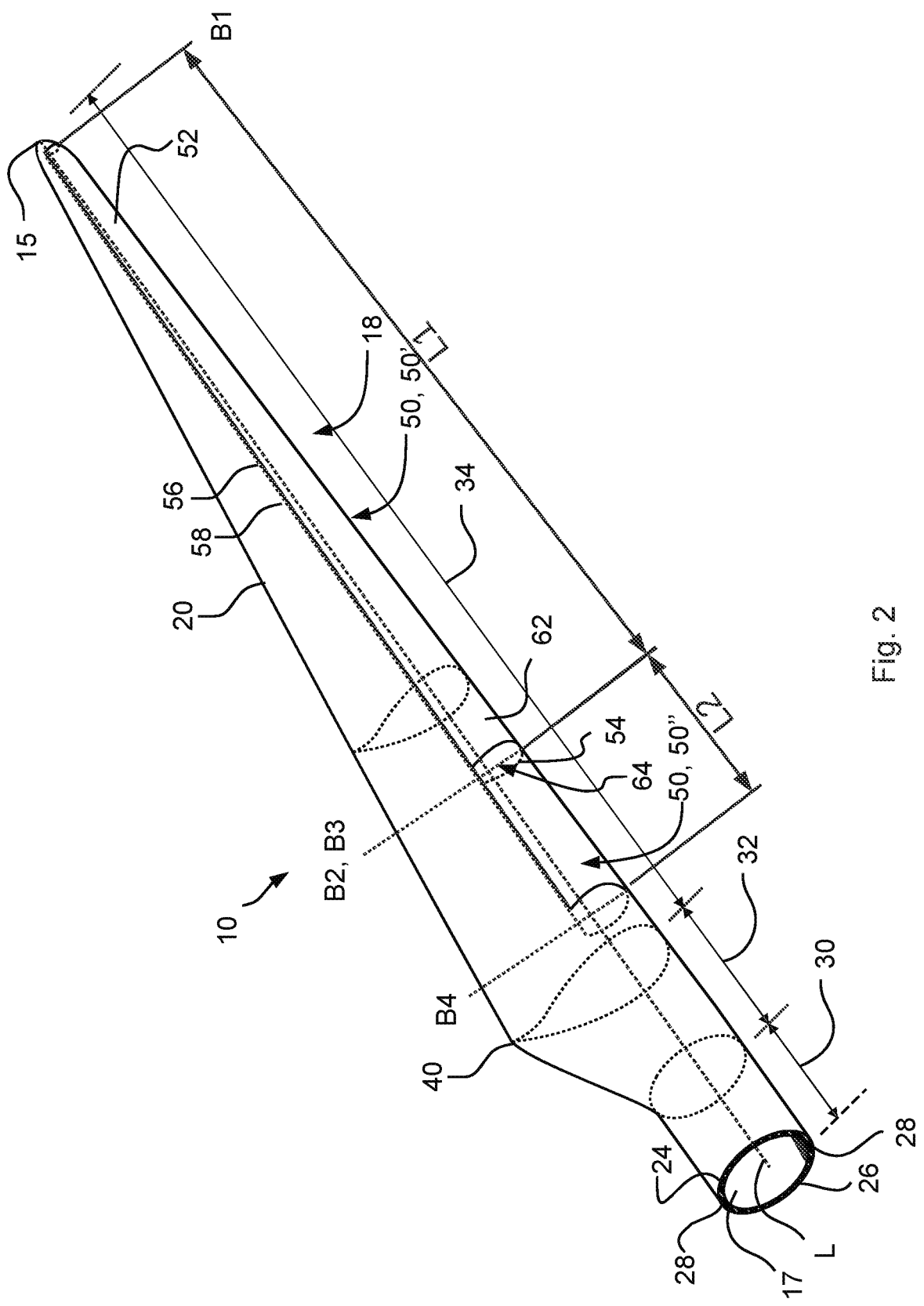
FIG. 2 is a schematic diagram illustrating an exemplary wind turbine blade.

FIG. 2 shows a schematic view of an exemplary wind turbine blade 10. The wind turbine blade 10 has the shape of a conventional wind turbine blade with a root end 17 and a tip end 15 and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The wind turbine blade 10 comprises a blade shell comprising two blade shell parts or half shells, a first blade shell part 24 and a second blade shell part 26, typically made of fibre-reinforced polymer. The wind turbine blade 10 may comprise additional shell parts, such as a third shell part and/or a fourth shell part. The first blade shell part 24 is typically a pressure side or upwind blade shell part. The second blade shell part 26 is typically a suction side or downwind blade shell part. The first blade shell part 24 and the second blade shell part 26 are fastened together with adhesive, such as glue, along bond lines or glue joints 28 extending along the trailing edge 20 and the leading edge 18 of the blade 10. Typically, the root ends of the blade shell parts 24, 26 has a semi-circular or semi-oval outer cross-sectional shape.

The wind turbine blade 10 comprises two leading edge protection elements 50, e.g., a first leading edge protection element 50' and a second leading edge protection element 50", on the leading edge 18 of the wind turbine blade 10. The first leading edge protection element 50' may be different from the second leading edge protection element 50". The first leading edge protection element 50' extends in a longitudinal direction between a first edge 52 and a second edge 54 and extends in a transverse direction between a third edge 56 and a fourth edge 58. The longitudinal direction of the leading edge protection elements 50 may be parallel to the longitudinal direction of the wind turbine blade 10. The length of the first leading edge protection element L1, e.g. the distance between the first edge 52 and the second edge 54, may be the same as the length of the leading edge 18 of the wind turbine blade 10. However, the length L1 may be smaller than the length of the leading edge 18 of the wind turbine blade 10, as illustrated. The first leading edge protection element 50' has a first surface 62 and a second surface 64. The second surface 64 of the leading edge protection element faces the leading edge 18 of the wind turbine blade.

The first leading edge protection element 50' extends from a first blade position B1, at the tip 15 or near the tip 15, to a second blade position B2. The second leading edge element 50" extends from a third blade position B3, which in the illustrated example, is the second blade position B2, to a fourth blade position B4. The length of the first leading edge element L1 and the length of the second leading edge element L2 may be different or the same. The length of the first leading edge element L1 may be larger than the length of the second leading edge element L2, as illustrated in FIG. 2, or the length of the second leading edge element L2 may be larger as the length of the first leading edge element L1.

The first leading edge protection element 50' and the second leading edge protection element 50" may be different. For example, the first leading edge protection element 50' and the second leading edge protection element 50" may be made of different materials, have different dimensions, or be composed of different layers.

Figure 3A:
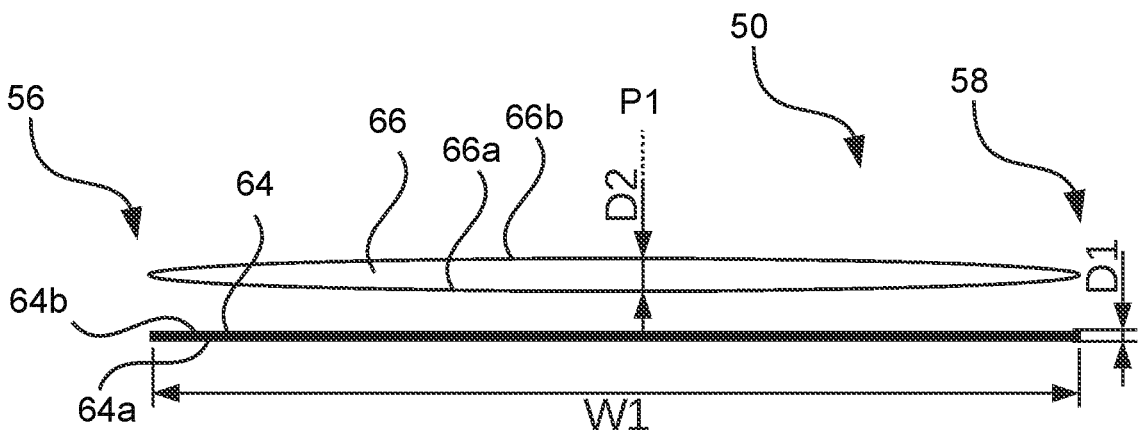
FIGS. 3A and 3B are schematic diagrams illustrating an exemplary leading edge protection element.

FIG. 3A is a schematic diagram illustrating a leading edge protection element 50, such as any of the leading edge protection elements 50 of FIG. 2. The leading edge protection element 50 comprises a film layer 64 and a rubber layer 66. The film layer 64 has a first film surface 64a and a second film surface 64b. The film layer 64 may comprise a metal material, e.g. the film layer 64 may be a metal film layer. The rubber layer 66 has a first rubber surface 66a and a second rubber surface 66b.

The second film surface 64b and the first rubber surface 66a are bonded to each other to form the leading edge protection element 50. For illustrative purposes, the film layer 64 and the rubber layer 66 are illustrated apart. The film layer 64 and the rubber layer 66 may be boned together by vulcanization of the rubber layer, which creates strong bonding between the two layers. Before bonding the film layer 64 and the rubber layer 66, the film layer may be chemically treated to remove any oxide layers, in order to provide a better film bonding surface 64b for the rubber layer 66. Alternatively, the film layer 64 and the rubber layer 66 may be bonded with and adhesive. The first film surface 64a forms the first surface of the leading edge protection element 50 and the second rubber surface 66b forms the second surface of the leading edge protection element 50 (see e.g. FIG. 3B).

The film layer has a thickness D1 between the first film surface 64a and the second film surface 64b, which may be less than 0.8 mm, such as less than 0.5 mm, such as between 0.1-0.4 mm. The rubber layer has a thickness D2 between the first rubber surface 66a and the second rubber surface

66b. D2 may be measured at a first rubber layer position P1, e.g. the thickest point of the rubber layer 66, and may be between 0.1-5.0 mm, such as between 0.5-2.0 mm.

The leading edge protection element has a width W1 between the third edge 56 and the fourth edge 58. The width W1 may be between 40-500 mm, e.g. between 50-400 mm, e.g. between 50-100 mm or between 200-400 mm. The width W1 of the leading edge protection element may correspondingly extend over the leading edge 18 of the wind turbine blade 10.

Figure 3B:
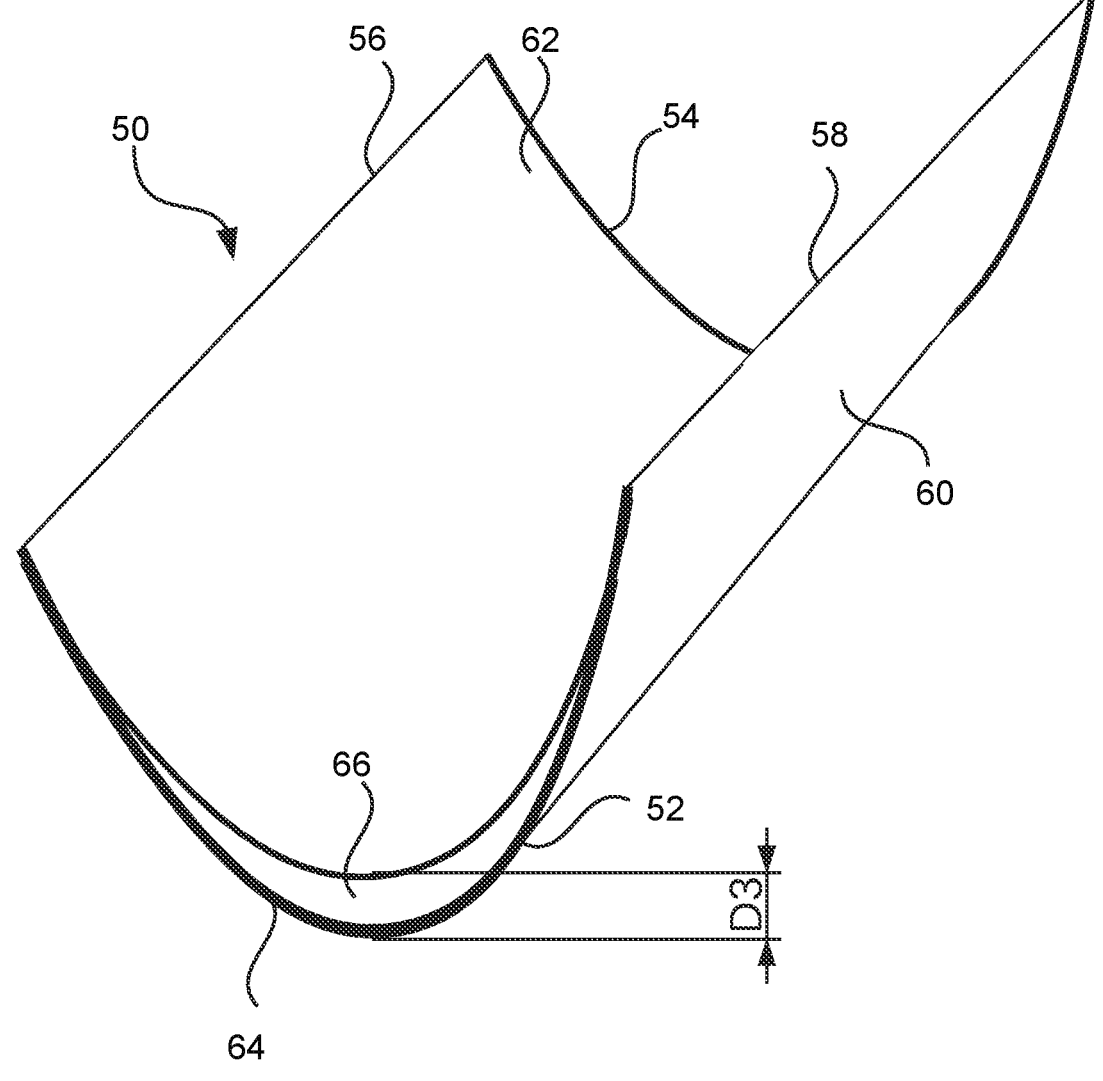

FIG. 3B is a schematic diagram illustrating a leading edge protection element 50, such as the leading edge protection element of FIGS. 2 and 3A. The leading edge protection element 50 comprises a film layer 64 and a rubber layer 66 adhered to each other. The leading edge protection element 50 extends in a longitudinal direction between a first edge 52 and a second edge 54 and in a transverse direction between a third edge 56 and a fourth edge 58.

The thickness D3 between the first surface 60 and the second surface 62 of the leading edge protection element decreases along the transverse direction towards the third edge 56 and/or towards the fourth edge 58. The thickness D3 between the first surface 60 and the second surface 62 of the leading edge protection element may decrease along the longitudinal direction towards the first edge 52 and/or towards the second edge 54. The thickness D1 between the first film surface 64a and the second film surface 64b of the film layer 64 is substantially uniform. The thickness D2 between the first rubber surface 66a and the second rubber surface 66b of the rubber layer 66 of the leading edge protection element 50 may decrease along the transverse direction towards the third edge 56 and towards the fourth edge 58. The thickness D2 between the first rubber surface 66a and the second rubber surface 66b of the rubber layer 66 of the leading edge protection element 50 may decrease along the transverse direction towards the first edge 52 and second edge 54.

Due to the combination of the film layer 64 and the rubber layer 66, the leading edge protection element 50 is flexible and robust. The flexibility of the leading edge protection element 50 also may enable the leading edge protection element 50 to be coiled on a roll, for easier handling and storage.

Figure 4:
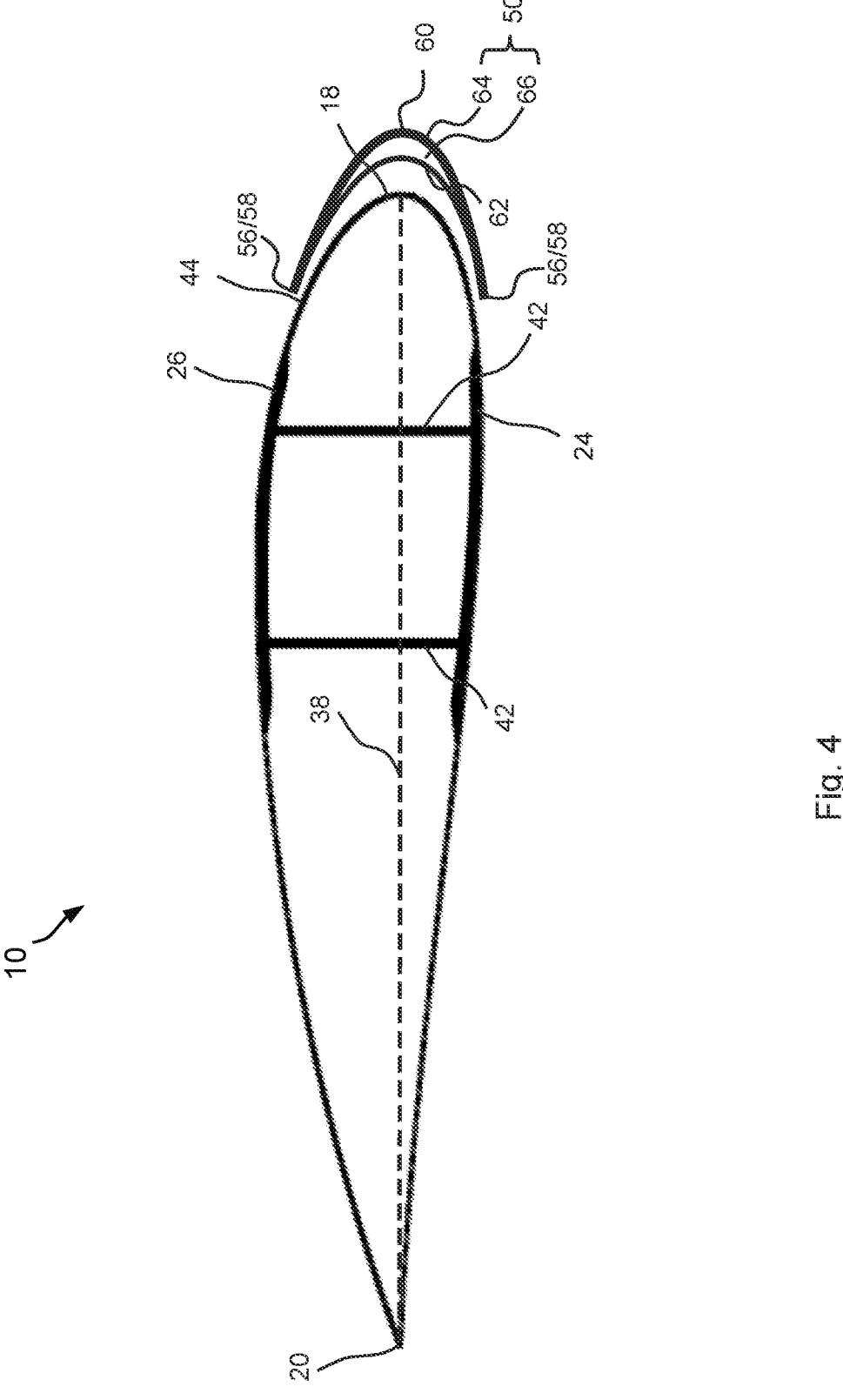
FIG. 4 is a schematic diagram illustrating an exemplary wind turbine blade.

FIG. 4 is a schematic diagram illustrating a cross sectional view of an exemplary wind turbine blade 10, e.g. a cross sectional view of the airfoil region of the wind turbine blade 10. The wind turbine blade 10 comprises a leading edge 18, a trailing edge 20, a pressure side 24 and a suction side 26. The wind turbine blade 10 comprises a chord line 38 between the leading edge 18 and the trailing edge 20. The wind turbine blade 10 comprises shear webs 42, such as a leading edge shear web and a trailing edge shear web. The shear webs 42 could alternatively be a spar box with spar sides, such as a trailing edge spar side and a leading edge spar side. The shell parts 24, 26 may comprise glass fibres.

The wind turbine blade 10 may be protected by providing a leading edge protection element 50, such as the leading edge protection element 50 of FIGS. 2 and 3B. The leading edge protection element 50 may be attached to the leading edge 18 of the wind turbine blade 10 by orienting the leading edge protection element 50 such that the second surface 62 faces the leading edge 18 of the wind turbine blade 10. The leading edge protection element 50 may be attached by applying an adhesive, e.g. a pressure sensitive adhesive or a two component adhesive and/or a heat activated adhesive. The adhesive may be applied on the second surface 62 of the leading edge protection element 50 or on the leading edge 18 of the wind turbine blade 10. The third edge 56 and the fourth edge 58 may extend substantially parallel to the longitudinal direction of the wind turbine blade when the leading edge protection element 50 is arranged and attached to the leading edge 18 of the wind turbine blade 10. The leading edge protection element 50 may be used in protection of the leading edge of completed wind turbine blades by attaching the leading edge protection element 50 to wind turbine blades coming out of the production or to wind turbine blades already installed in the field. Furthermore, the leading edge protection element 50 may be attached to portions of the leading edge where there is a need for repair of existing leading edge protection elements. The third edge 56 and the fourth edge 58 are tapered such that the transition to the airfoil is minimal.

Figure 5A:
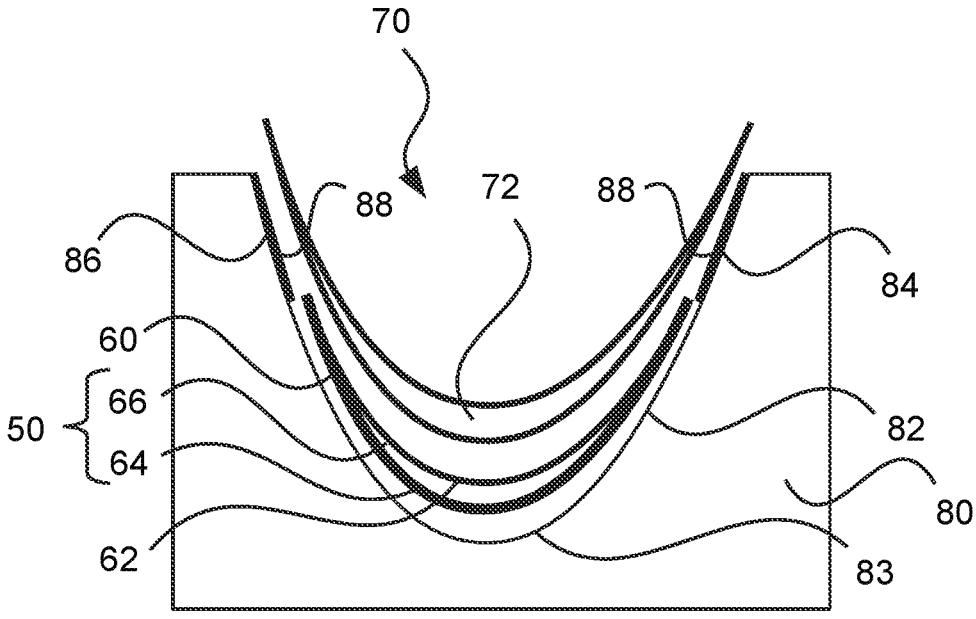
FIGS. 5A and 5B are schematic diagrams illustrating an exemplary leading edge portion.

FIG. 5A is a schematic diagram illustrating a mould 80 for manufacturing a leading edge portion 70 of a wind turbine blade. The leading edge portion 70 is manufactured by providing a leading edge protection element 50, such as the leading edge protection elements 50 of FIGS. 2-4, in a mould 80. The mould 80 comprises a moulding surface 82 configured for forming the primary surface 74 of the leading edge portion 70. The leading edge protection element 50 is laid up on a first part 83 of the moulding surface 82 of the mould, e.g. by orienting the leading edge protection element 50 such that the first surface 60 of the leading edge protection element faces the moulding surface 82 of the mould. A shell material 70, such as fibre reinforced material, is laid in the mould 80 covering the second surface 62 of the leading edge protection element 50. The shell material 70 may be a sheet of material, such as glass fibre. The shell material 70 may be laid up such that the shell material 70 covers a second part 84 and/or a third part 86 of the moulding surface 82 of the mould 80. A coating 88 may be applied to the second part 84 of the moulding surface and/or the third part 86 of the moulding surface. The shell material 70 and the leading edge protection element 50 is then consolidated, e.g. by infusing the shell material 70 and the leading edge protection element 50 with a resin and curing the resin, to form the leading edge portion 70. Vacuum assisted resin transfer moulding (VARTM) may be applied.

Figure 5B:
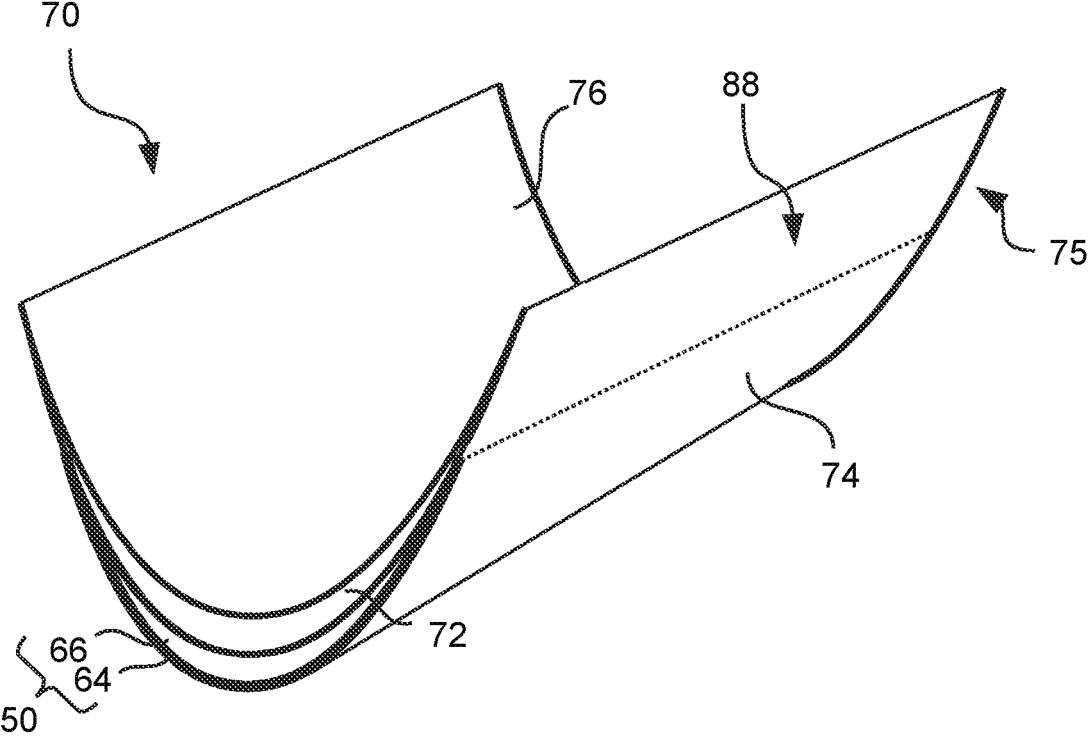

FIG. 5B is a schematic diagram illustrating a leading edge portion 70 after infusion and curing, such as the leading edge portion described in FIG. 5A. A first part 75 of the primary surface 74 may be coated with a coating 88 applied in the mould, as described in FIG. 5A. The coating 88 may provide an aerodynamic transition from the leading edge protection element 50 to the shell material 72, while also providing a protective coating of the shell material 72.

Figure 6:
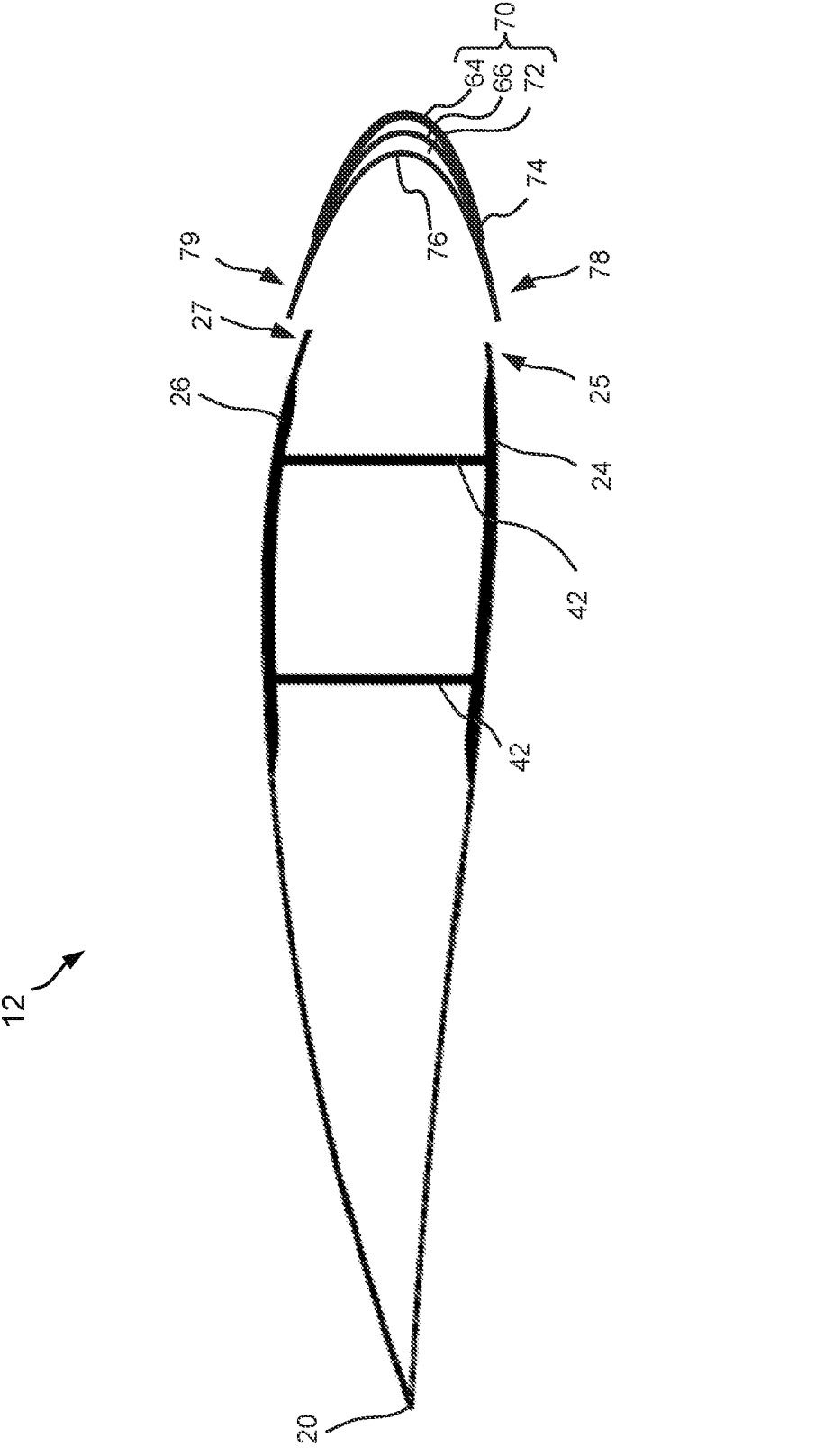
FIG. 6 is a schematic diagram illustrating an exemplary wind turbine blade.

FIG. 6 is a schematic diagram illustrating a wind turbine blade part 12 and a leading edge portion 70, such as the leading edge portion of FIGS. 5A and 5B. The leading edge portion 70 may be attached to a leading part of the pressure side 25 of the wind turbine blade part 12 and a leading part of the suction side 27 of the wind turbine blade part 12, e.g. by orienting the leading edge portion 70 such that the secondary surface 76 faces the wind turbine blade part 12. An adhesive may be applied to a first part 78 and a second part 79 of the leading edge portion, and/or the adhesive may be applied to the leading part 25 of the pressure side and the leading part 27 of the suction side of the wind turbine blade part 12. The leading edge portion 70 may be attached to the outer surface of the wind turbine blade part 12, e.g. the leading part 25 of the pressure side and the leading part 27 of the suction side, or the leading edge portion 70 may be attached to the inner surface of the wind turbine blade part 12.

Figures 7A, 7B:
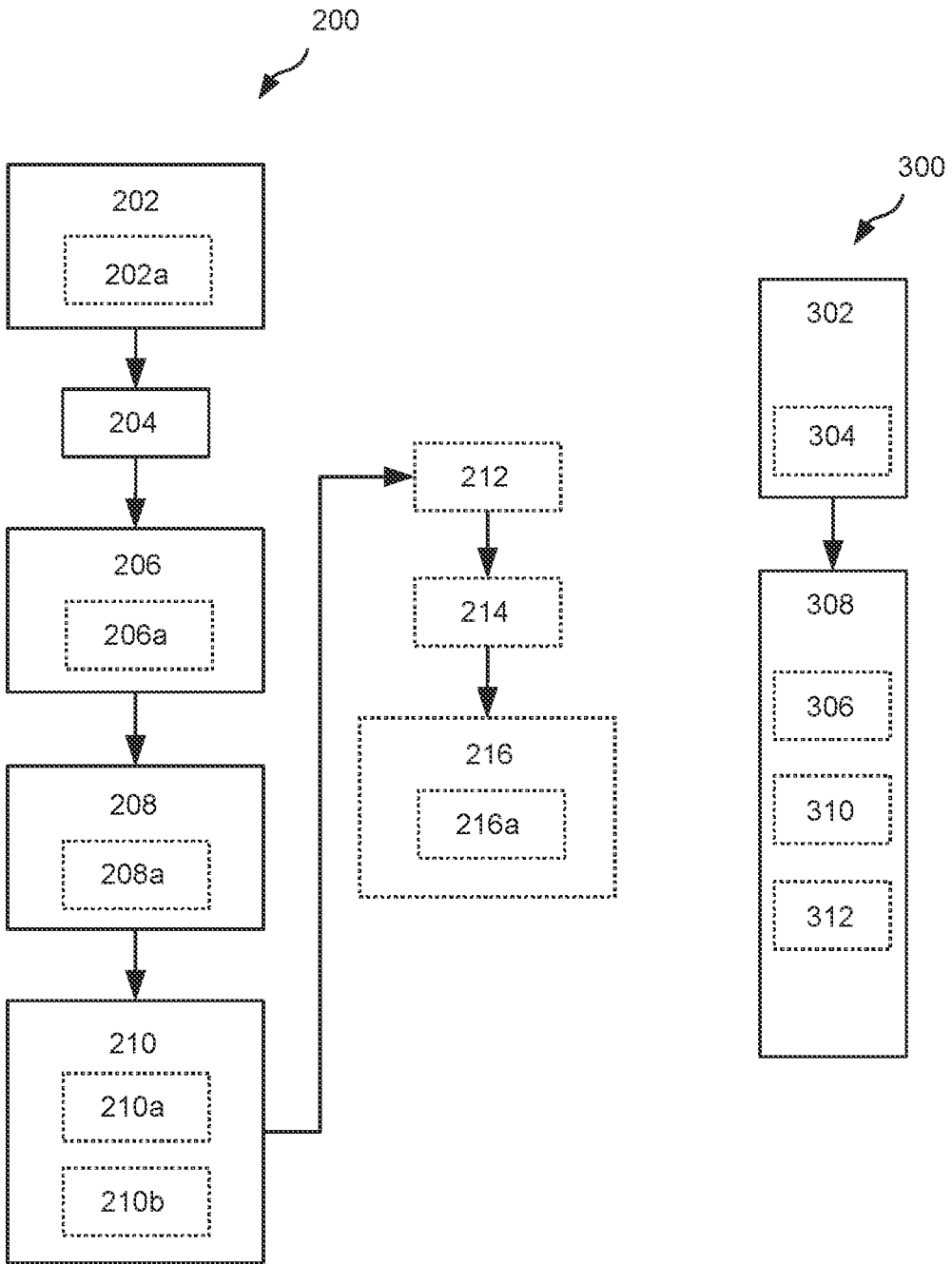
FIGS. 7A and 7B are block diagrams of exemplary methods.

FIG. 7A is a block diagram of an exemplary method 200 for manufacturing a leading edge portion of a wind turbine blade, such as the leading edge portion of FIGS. 5-6.

The method 200 comprises providing 202 a leading edge protection element, such as the leading edge protection element of FIGS. 2-4, in a mould. Providing 202 the leading edge protection element may comprise providing 202a a roll of the leading edge protection element. The method 200 comprises providing 204 a mould for moulding a leading edge for moulding the leading edge portion of the wind turbine blade. The mould comprises a moulding surface configured for forming the primary surface of the leading edge portion.

The method 200 comprises laying up 206 the leading edge protection element covering a first part of the moulding surface of the mould. The method 200 may comprise orienting 206a the leading edge protection element such that the first surface of the leading edge protection element faces the moulding surface of the mould.

The method 200 comprises providing and laying up 208 a shell material, such as fibre material, in the mould covering the second surface of the leading edge protection element. The method 200 may comprise laying up the shell material such that the shell material covers 208a a second part and/or a third part of the moulding surface of the mould. The shell material may be a sheet of material, e.g. glass fibre.

The method 200 comprises consolidating 210 the shell material and the leading edge protection element. Consolidating 210 may comprise infusing 210a the shell material and the leading edge protection element with resin and curing 210b the resin to form the leading edge portion. Vacuum assisted resin transfer moulding (VARTM) may be applied.

The method 200 optionally comprises providing 212 a wind turbine blade part and attaching 214 the leading edge portion to a leading part of the pressure side and a leading part of the suction side. The method 200 may comprise orienting 214 the leading edge portion such that the secondary surface faces the wind turbine blade part before optionally attaching 216 the leading edge portion to the wind turbine blade part. Attaching 216 may comprise applying 216a an adhesive between the leading edge portion and the wind turbine blade part.

FIG. 7B illustrates an exemplary method 300 for protecting a leading edge of a wind turbine blade, such as a wind turbine blade of FIGS. 1-2 and 4. The method 300 comprises providing 302 a leading edge protection element, such as the leading edge protection element of FIGS. 2-4, wherein the leading edge protection element comprises a film layer and a rubber layer adhered together. Providing 302 the leading edge protection element may comprise providing 304 a coiled up roll of leading edge protection element.

The method 300 comprises attaching 308 the leading edge protection element to the leading edge of a wind turbine blade, e.g. comprising orienting 306 the leading edge protection element such that the second surface faces the leading edge of the wind turbine blade. Attaching 308 the leading edge protection element may comprise applying 310 an adhesive, e.g. a pressure sensitive adhesive or a two component adhesive and/or a heat activated adhesive. The adhesive may be applied on the second surface of the leading edge protection element and/or on the leading edge of the wind turbine blade. Attaching 308 the leading edge protection element to the leading edge of the wind turbine blade may comprise arranging 312 the leading edge protection element such that the third edge and/or the fourth edge extend substantially parallel to the longitudinal direction of the wind turbine blade. The leading edge protection element may be attached 308 to the leading edge of completed wind turbine blades by attaching the leading edge protection element to wind turbine blades coming out of the production or to wind turbine blades already installed in the field. Furthermore, the leading edge protection element may be attached 308 to portions of the leading edge where there is a need for repair of existing leading edge protection elements.

The invention has been described with reference to preferred embodiments. However, the scope of the invention is not limited to the illustrated embodiments, and alterations and modifications can be carried out without deviating from the scope of the invention.

Items

Exemplary embodiments of the present disclosure are set out in the following items:

1. A leading edge protection element for a wind turbine blade, the leading edge protection element extending in a longitudinal direction between a first edge and a second edge and extending in a transverse direction between a third edge and a fourth edge, the leading edge protection element having a first surface and a second surface,
   the leading edge protection element comprising:
   a film layer having a first film surface and a second film surface, the first film surface forming the first surface of the leading edge protection element, wherein the film layer comprises a metal material,
   a rubber layer of a rubber material having a first rubber surface and a second rubber surface, the second rubber surface forming the second surface of the leading edge protection element,
   wherein the second film surface and the first rubber surface are bonded to each other.

2. Leading edge protection element according to item 1, wherein the second film surface and the first rubber surface are bonded by vulcanization of the rubber layer.

3. Leading edge protection element according to any of the items 1-2, wherein the second film surface and the first rubber surface are bonded by an adhesive.

4. Leading edge protection element according to any of the items 1-3, wherein the metal material comprises nickel-based alloy, titanium, stainless steel, shape-memory-alloy and/or aluminium.

5. Leading edge protection element according to any of the items 1-4, wherein the thickness of the film layer is less than 0.8 mm, such as less than 0.5 mm, such as between 0.1-0.4 mm.

6. Leading edge protection element according to any of the items 1-5, wherein the film layer is chemically treated to remove any oxide layer of the metal material before the second film surface and the first rubber surface are bonded to each other.

7. Leading edge protection element according to any of the items 1-6, wherein the rubber material comprises one or more of nitrile rubber (NBR), ethylene propylene diene monomer (EPDM), polyurethane (PUR), styrene-butadiene rubber (SBR) or polybutadiene.

8. Leading edge protection element according to any of the items 1-7, wherein the rubber material has a Shore A indentation hardness of less than 90.

9. Leading edge protection element according to any of the items 1-8, wherein the thickness of the rubber layer in a first rubber layer position between the first rubber surface and the second rubber surface is between 0.1-5.0 mm, such as between 0.5-2.0 mm.

10. Leading edge protection element according to any of the items 1-9, wherein the width of the leading edge protection element in the transverse direction is between 40-500 mm, e.g. between 50-400 mm, e.g. between 50-100 mm.

11. Leading edge protection element according to any of the items 1-10, wherein the length of the leading edge protection element is between 10-100 m, such as between 15-70 m.

12. Leading edge protection element according to any of the items 1-11, wherein the thickness between the first surface and the second surface of the leading edge protection element decreases along the transverse direction towards the third edge and/or towards the fourth edge.

13. Leading edge protection element according to any of the items 1-12, wherein the thickness between the first surface and the second surface of the leading edge protection element decreases along the longitudinal direction towards the first edge and/or towards the second edge.

14. Leading edge protection element according to any of the items 1-13, wherein the thickness between the first film surface and the second film surface of the film layer is substantially uniform.

15. Leading edge protection element according to any of the items 1-14 wherein the leading edge protection element is coiled on a roll.

16. A method for manufacturing a leading edge portion of a wind turbine blade, the leading edge portion having a primary surface and a secondary surface opposite the primary surface, the method comprising:

providing a leading edge protection element, the leading edge protection element extending in a longitudinal direction between a first edge and a second edge and extending in a transverse direction between a third edge and a fourth edge, the leading edge protection element having a first surface and a second surface, the leading edge protection element comprising: a film layer having a first film surface and a second film surface, the first film surface forming the first surface of the leading edge protection element, wherein the film layer comprises a metal material; a rubber layer of a rubber material having a first rubber surface and a second rubber surface, the second rubber surface forming the second surface of the leading edge protection element, wherein the second film surface and the first rubber surface are bonded to each other, providing a mould for moulding the leading edge portion of the wind turbine blade, the mould comprising a moulding surface configured for forming the primary surface of the leading edge portion, laying up the leading edge protection element covering a first part of the moulding surface of the mould, providing and laying up shell material in the mould covering the second surface of the leading edge protection element, and consolidating the leading edge protection element and the shell material to form the leading edge portion, wherein the first surface of the leading edge protection element forms a section of the primary surface of the leading edge portion.

17. Method according to item 16, wherein laying up the leading edge protection element in the mould comprises orienting the leading edge protection element such that the first surface of the leading edge protection element faces the moulding surface of the mould.

18. Method according to any of the items 16-17, wherein laying up the shell material comprises laying up the shell material covering a second part and/or a third part of the moulding surface of the mould.

19. Method according to any of the items 16-18 wherein consolidating the leading edge protection element and the shell material comprises infusing the leading edge protection element and the shell material with a resin and curing the resin.

20. A method for protecting a leading edge of a wind turbine blade, wherein the wind turbine blade extends from a root to a tip, and comprising a root region, an airfoil region with the tip, a pressure side, a suction side and a chord line extending between the leading edge and a trailing edge, the method comprising:

providing a leading edge protection element, the leading edge protection element extending in a longitudinal direction between a first edge and a second edge and extending in a transverse direction between a third edge and a fourth edge, the leading edge protection element having a first surface and a second surface, the leading edge protection element comprising: a film layer having a first film surface and a second film surface, the first film surface forming the first surface of the leading edge protection element, wherein the film layer comprises a metal material; a rubber layer of a rubber material having a first rubber surface and a second rubber surface, the second rubber surface forming the second surface of the leading edge protection element, wherein the second film surface and the first rubber surface are bonded to each other, attaching the leading edge protection element to at least a part of the leading edge of the wind turbine blade.

21. Method according to item 20, wherein providing the leading edge protection element comprises orienting the leading edge protection element such that the second surface of the leading edge protection element faces the leading edge of the wind turbine blade.

22. Method according to any of the items 20-21, wherein attaching the leading edge protection element comprises applying an adhesive, e.g. a pressure sensitive adhesive or a two component adhesive, on the second surface of the leading edge protection element and/or on a portion of the leading edge of the wind turbine blade.

23. Method according to any of the items 20-22, wherein attaching the leading edge protection element comprises arranging the leading edge protection element such that the third edge and/or the fourth edge extends substantially parallel to the longitudinal direction of the wind turbine blade.

24. Method according to any of the items 20-23, wherein the thickness of the leading edge protection element between the first surface and the second surface decreases towards the third edge and towards the fourth edge.

LIST OF REFERENCES 2 wind turbine
4 tower

17

6 nacelle
8 hub
10 blade
12 blade part
14 blade tip
15 tip end
16 blade root
17 root end
18 leading edge
20 trailing edge
24 first blade shell part (pressure side)
25 leading part of pressure side
26 second blade shell part (suction side)
27 leading part of suction side
28 bond lines/glue joints
30 root region
32 transition region
34 airfoil region
34*a* first airfoil region
34*b* second airfoil region
36 first shell part flange
38 second shell part flange
40 shoulder
42 shear web or spar side
50 leading edge protection element
50' first leading edge protection element
50" second leading edge protection element
52 first edge
54 second edge
56 third edge
58 fourth edge
60 first surface
62 second surface
64 film layer
64*a* first film surface
64*b* second film surface
66 rubber layer
66*a* first rubber surface
66*b* second rubber surface
68 first rubber layer position
70 leading edge portion
72 shell material
74 primary surface
75 first part of primary surface
76 secondary surface
78 first part
79 second part
80 mould
82 moulding surface
83 first part of moulding surface
84 second part of moulding surface
86 third part of moulding surface
88 coating
L1 length of first leading edge protection element
L2 length of second leading edge protection element
W1 width of leading edge protection element
P1 first rubber layer position
D1 thickness of film layer
D2 thickness of rubber layer
D3 thickness of leading edge protection element
B1 first blade position
B2 second blade position
B3 third blade position
B4 fourth blade position
200 method for manufacturing leading edge portion
202 providing leading edge protection element
202*a* providing a roll of leading edge protection element

18

204 providing mould
206 laying up leading edge protection element
206*a* orienting leading edge protection element
208 providing and laying up shell material
208*a* contacting second part and/or third part
210 consolidating
210*a* infusing
210*b* curing
212 providing wind turbine blade part
214 orienting leading edge portion
216 attaching
216*a* applying adhesive
300 method for protecting leading edge
302 providing leading edge protection element
304 providing a roll
306 orienting
308 attaching
310 applying adhesive
312 arranging

The invention claimed is:

1. A leading-edge protector element for protecting a leading-edge of a wind turbine blade, wherein the leading-edge protector element comprises a film layer and a rubber layer, wherein the leading-edge protector element comprising the film layer and the rubber layer is provided on a coiled-up roll, wherein the leading-edge protector element has a thickness between a first edge, a second edge, a third edge, and a fourth edge, and wherein said thickness decreases along a transverse direction towards the third edge and towards the fourth edge.

2. The leading-edge protector element of claim 1, wherein the leading-edge protector element has a length between 10-100 m, such as between 15-70 m, such as between 20-50 m, such as 30 m.

3. The leading-edge protector element of claim 1, wherein the decrease in thickness towards the third edge and towards the fourth edge is provided by tapering or chamfering towards the third edge and towards the fourth edge.

4. The leading-edge protector element of claim 1, wherein the thickness of the leading-edge protection element towards the third edge and toward the fourth edge is provided by a decrease in a thickness of the rubber layer while a thickness of the film layer is substantially uniform.

5. The leading-edge protector element of claim 1, wherein the rubber layer comprises one or more of nitrile rubber (NBR), ethylene propylene diene monomer (EPDM), polyurethane (PUR), styrene-butadiene rubber (SBR) or polybutadiene.

6. The leading-edge protector element of claim 1, wherein the film layer comprises a metal material.

7. The leading-edge protector element of claim 4, wherein the metal film layer comprises a nickel-based alloy, titanium, stainless steel, shape memory alloys, austenitic nickel-chromium-based alloys, and/or aluminium.

8. The leading-edge protector element of claim 1, wherein the thickness of the leading-edge protector element decreases along a longitudinal direction towards the first edge and towards the second edge.

9. The leading-edge protector element of claim 1, wherein the film layer has a thickness less than 0.8 mm, and wherein the rubber layer, at a thickest point thereof, has a thickness between 0.1 mm and 2.0 mm.

10. A kit comprising a plurality of leading-edge protection elements for a wind turbine blade, wherein the plurality of leading-edge protection elements are provided as a coiled-up roll, such that one of the leading-edge protection elements of a desired length can be cut from the coiled-up roll, wherein the leading-edge protector elements each comprise a film layer and a rubber layer, wherein each of the leading-edge protector elements has a thickness between a first edge, a second edge, a third edge, and a fourth edge, and wherein said thickness decreases along a transverse direction towards the third edge and towards the fourth edge.

11. A method for protecting a leading edge of a wind turbine blade already installed in the field, the method comprising:

providing a leading-edge protector element on a coiled-up roll, wherein the leading-edge protector element comprises a film layer and a rubber layer, wherein the leading-edge protector element has a thickness between a first edge, a second edge, a third edge, and a fourth edge, and wherein said thickness decreases along a transverse direction towards the third edge and towards the fourth edge; and attaching the leading-edge protection element to the leading-edge of the wind turbine blade.

12. The method of claim 11, wherein the attaching of the leading-edge protection element to the leading-edge of the wind turbine blade comprises applying a pressure sensitive adhesive, a two-component adhesive and/or a heat activated adhesive between the leading-edge protection element and the leading edge of the wind turbine blade.

13. The method of claim 11, wherein the method further comprises repairing a damaged leading-edge protection element by attaching a new leading-edge protection element to the leading edge protection element attached to the leading-edge of the wind turbine blade.

14. A method of manufacturing a wind turbine blade having a leading-edge protection element, the method comprising:

providing a leading-edge protector element on a coiled-up roll, wherein the leading-edge protector element comprises a film layer and a rubber layer, wherein the leading-edge protector element has a thickness between a first edge, a second edge, a third edge, and a fourth edge, and wherein said thickness decreases along a transverse direction towards the third edge and towards the fourth edge;

providing a mold for molding a leading-edge portion of the wind turbine blade;

laying up the leading-edge protection element covering a first part of the molding surface of the mold;

providing and laying up a shell material in the mold covering the leading edge-protection element; and consolidating the shell material and the leading-edge protection element.

15. A leading-edge protector element for protecting a leading-edge of a wind turbine blade, wherein the leading-edge protector element comprises a film layer and a rubber layer, wherein the leading-edge protector element comprising the film layer and the rubber layer is provided on a coiled-up roll, wherein the leading-edge protector element has a thickness between a first edge, a second edge, a third edge, and a fourth edge, wherein said thickness decreases along a transverse direction towards the third edge and towards the fourth edge, and wherein the rubber layer comprises one or more of nitrile rubber (NBR), ethylene propylene diene monomer (EPDM), polyurethane (PUR), styrene-butadiene rubber (SBR) or polybutadiene.

16. The leading-edge protector element of claim 15, wherein the film layer comprises a metal material.

\* \* \* \* \*